(12) United States Patent
Zhang

(10) Patent No.: US 12,284,295 B2
(45) Date of Patent: Apr. 22, 2025

(54) CONSENSUS METHOD FOR BLOCKCHAIN, CONSENSUS NODE, ELECTRONIC DEVICE, AND STORAGE MEDIUM

(71) Applicant: Jingdong Technology Information Technology Co., Ltd., Beijing (CN)

(72) Inventor: Shuang Zhang, Beijing (CN)

(73) Assignee: Jingdong Technology Information Technology Co., Ltd., Beijing (CN)

( * ) Notice: Subject to any disclaimer, the term of this patent is extended or adjusted under 35 U.S.C. 154(b) by 410 days.

(21) Appl. No.: 17/773,558

(22) PCT Filed: Mar. 3, 2020

(86) PCT No.: PCT/CN2020/077538
§ 371 (c)(1),
(2) Date: Apr. 29, 2022

(87) PCT Pub. No.: WO2021/082315
PCT Pub. Date: May 6, 2021

(65) Prior Publication Data
US 2022/0407726 A1    Dec. 22, 2022

(30) Foreign Application Priority Data
Oct. 30, 2019   (CN) .......................... 201911041448.7

(51) Int. Cl.
*H04L 9/00*    (2022.01)
*H04L 9/32*    (2006.01)
(52) U.S. Cl.
CPC .............. *H04L 9/50* (2022.05); *H04L 9/3236* (2013.01)

(58) Field of Classification Search
None
See application file for complete search history.

(56) References Cited

U.S. PATENT DOCUMENTS 11,316,659 B2 *  4/2022  van de Ruit .......... H04L 9/0618
11,438,181 B1 *  9/2022  Yamada ................. H04L 9/12
(Continued)

FOREIGN PATENT DOCUMENTS

CN    107493162 A    12/2017
CN    108985732 A    12/2018
(Continued)

OTHER PUBLICATIONS

First Examination Opinion Notice dated May 28, 2020 for Chinese application No. 201911041448.7.
Tuyet Duong et al., "2-hop Blockchain: Combining Proof-of-Work and Proof-of-Stake Securely," Apr. 15, 2017, pp. 1-43.
Yuan Yong et al., "Blockchain Consensus Algorithms: The State of the Art and Future Trends," ACTA Automatica Sinica, vol. 44, No. 11, Nov. 2018, pp. 2011-2022.
(Continued)

*Primary Examiner* — Christopher C Harris

(57) ABSTRACT

The present application provides a consensus method for a blockchain, a consensus node, an electronic device, and a storage medium. The method includes: receiving a transaction request sent by an object, calculating a first hash value of executing the at least one transaction task by a consensus node, determining a second hash value according to the first hash value and the at least one transaction task, receiving third hash values broadcasted by other consensus nodes, and generating and adding to the blockchain a block containing the first hash value in response to the second hash value being the same as at least half of the third hash values.

15 Claims, 9 Drawing Sheets

(56) References Cited

U.S. PATENT DOCUMENTS

| | | | |
|---|---|---|---|
| 2018/0248880 A1 | 8/2018 | Sardesai et al. | |
| 2019/0182028 A1 | 6/2019 | Arquero et al. | |
| 2021/0117410 A1* | 4/2021 | Sekniqi | G06F 16/2379 |
| 2021/0192512 A1* | 6/2021 | Che | H04L 9/3247 |

FOREIGN PATENT DOCUMENTS

| | | |
|---|---|---|
| CN | 108989052 A | 12/2018 |
| CN | 109409122 A | 3/2019 |
| CN | 109995536 A | 7/2019 |
| CN | 110009759 A | 7/2019 |
| CN | 110032880 A | 7/2019 |
| CN | 110084601 A | 8/2019 |
| CN | 110222537 A | 9/2019 |
| CN | 110233737 A | 9/2019 |
| CN | 110825755 A | 2/2020 |
| WO | WO2019028442 A1 | 2/2019 |
| WO | WO2019038839 A1 | 2/2019 |

OTHER PUBLICATIONS

Second Examination Opinion Notice dated Aug. 12, 2020 for Chinese application No. 201911041448.7.
Third Examination Opinion Notice dated Nov. 17, 2020 for Chinese application No. 201911041448.7.
International Search Report dated Jul. 24, 2020 for PCT application No. PCT/CN2020/077538.
Han Xuan et al., "Security Problems on Blockchain: The State of the Art and Future Trends," ACTA Automatica Sinica, vol. 45, No. 1, Jan. 2019, pp. 206-225.
Notice of Allowance dated Feb. 20, 2021 for Chinese application No. 21911041448.7.
Extended European Search Report dated Oct. 4, 2023 regarding European Application No. 20881893.0.
Andreas M Antonopoulos: "Mastering Bitcoin", Jul. 21, 2017, ISBN: 978-1-4919-5438-6, Retrieved from the Internet: URL:https://www.oreilly.com/library/view/mastering-bitcoin-2nd/9781491954379/.

* cited by examiner

CONSENSUS METHOD FOR BLOCKCHAIN, CONSENSUS NODE, ELECTRONIC DEVICE, AND STORAGE MEDIUM

CROSS-REFERENCE TO RELATED APPLICATION

The present application is a national stage of International Application No. PCT/CN2020/077538, filed on Mar. 3, 2020, which claims priority to Chinese Patent Application No. 201911041448.7, filed on Oct. 30, 2019. Both of the aforementioned applications are hereby incorporated by reference in their entireties.

TECHNICAL FIELD

The present application relates to the technical field of blockchain, and more particularly, to a consensus method for a blockchain, a consensus node, an electronic device, and a storage medium.

BACKGROUND

Blockchain is an underlying open source technology, which involves computer technologies including a collection of new application modes such as distributed data storage, peer-to-peer transmission, consensus mechanism, an encryption algorithm, and has the characteristics of decentralization, rule application de-trust, security protection de-monopoly, etc., and a consensus is one of the important technologies in the blockchain.

In the existing art, a blockchain consensus includes practical byzantine fault tolerance (PBFT), etc., and a transaction request is mainly broadcasted by a proposing node, and each of consensus nodes (including the proposing node) executes a transaction task carried in the transaction request, and packages a result of executing the transaction task into a new block for a processing of adding to a blockchain.

SUMMARY

In a first aspect, the present application discloses a consensus method for a blockchain, and the method includes:
  receiving a transaction request sent by an object, where the transaction request carries at least one transaction task;
  calculating a first hash value of executing the at least one transaction task by a consensus node;
  determining a second hash value according to the first hash value and the at least one transaction task;
  receiving third hash values broadcasted by other consensus nodes, where each of the third hash values is determined by each of the other consensus nodes according to a result of executing the at least one transaction task by the each of the other consensus nodes and the at least one transaction task;
  in response to the second hash value being the same as at least half of the third hash values, generating a block containing the first hash value and adding the block to the blockchain.

In this embodiment, the third hash values broadcasted by the other consensus nodes are received, so that the second hash value is compared with each third hash value to determine whether the second hash value and each third hash value are the same. If half or more than half of the third hash values are the same as the second hash value, the block containing the first hash value is generated, and the generated block is added to the blockchain. Since the block containing the first hash value is generated and added to the blockchain when the second hash value is the same as half or more than half of the third hash values, consistency of distributed ledgers can be realized.

In an implementation, after receiving the third hash values broadcasted by the other consensus nodes, the method further includes:
  generating and feeding back feedback information of consensus failure to the object in response to less than half of the third hash values being the same as the second hash value.

In an implementation, after receiving the third hash values broadcasted by the other consensus nodes, the method further includes:
  rolling back the at least one transaction task in response to less than half of the third hash values being the same as the second hash value.

In an implementation, after receiving the third hash values broadcasted by the other consensus nodes, the method further includes:
  acquiring a total number of the third hash values, and acquiring a same number of third hash values that are the same as the second hash value;
  judging whether the total number is less than or equal to twice of the same number;
  if yes, performing the generating the block containing the first hash value and adding the block to the blockchain.

In a second aspect, the present application discloses a consensus node, and the consensus node includes:
  a first receiving module, configured to receive a transaction request sent by an object, where the transaction request carries at least one transaction task;
  a calculating module, configured to calculate a first hash value of executing the at least one transaction task by the consensus node;
  a determining module, configured to determine a second hash value according to the first hash value and the at least one transaction task;
  a second receiving module, configured to receive third hash values broadcasted by other consensus nodes, where each of the third hash values is determined by each of the other consensus nodes according to a result of executing the at least one transaction task by the each of the other consensus nodes and the at least one transaction task;
  a first generating module, configured to generate a block containing the first hash value in response to the second hash value being the same as at least half of the third hash values; and
  an adding module, configured to add a block containing the first hash value to a blockchain.

In an implementation, the consensus node further includes:
  a second generating module, configured to generate feedback information of consensus failure in response to less than half of the third hash values being the same as the second hash value; and
  a feedback module, configured to feed back the feedback information to the object.

In an implementation, the consensus node further includes:
  a rollback module, configured to roll back the at least one transaction task in response to less than half of the third hash values being the same as the second hash value.

In an implementation, the consensus node further includes:

an acquiring module, configured to acquire a total number of the third hash values, and acquiring a same number of third hash values that are the same as the second hash value;

a judging module, configured to judge whether the total number is less than or equal to twice of the same number; and the first generating module being configured to execute the generation of the block containing the first hash value if the total number is less than or equal to twice of the same number.

In a third aspect, the present application discloses an electronic device, including a processor and a memory; where, the memory is configured to store program code;

the processor is configured to call the program code stored in the memory to execute the method described in any one of the above embodiments.

In a fourth aspect, the present application discloses a computer-readable storage medium having an instruction stored therein, and when the instruction is run on a computer, the computer is caused to execute the method as described in any one of the above embodiments.

In a fifth aspect, the present application discloses a computer program including program code, and when a computer runs the computer program, the program code executes the method as described in any one of the above embodiments.

Figure 1:
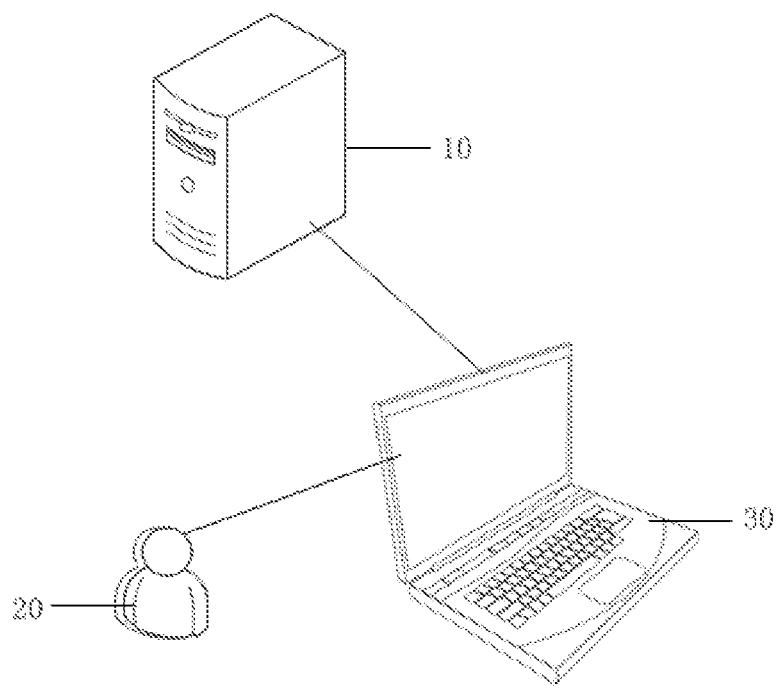
FIG. 1 is a schematic diagram of an application scenario of a consensus method for a blockchain according to one or more embodiments of the present application.

REFERENCE NUMERALS 10 server; 20 user; 30 terminal device; 1 first receiving module; 2 calculating module; 3 determining module; 4 second receiving module; 5 first generating module; 6 adding module; 7 second generating module; 8 feedback module; 9 rollback module; 10 acquiring module; 11 judging module.

DESCRIPTION OF EMBODIMENTS

Illustrative embodiments will be described in detail herein, examples of which are shown in the accompanying drawings. When the following description refers to the drawings, same numbers in different drawings indicate same or similar element unless otherwise indicated. Implementations described in the following illustrative embodiments do not represent all the implementations consistent with the present application. Instead, they are only examples of apparatuses and methods consistent with some aspects of the present application as detailed in the appended claims.

In a process of realizing the present application, the inventor found that there is at least the following problem: distributed ledgers after a block is added to a chain are inconsistent.

A consensus method for a blockchain according to an embodiment of the present application can be applied to an application scenario as shown in FIG. 1.

In the application scenario shown in FIG. 1, the consensus method for a blockchain in the embodiment of the present application is applied to a server 10, and a user 20 may initiate a transaction request through a terminal device 30 (the terminal device is a computer in FIG. 1).

Of course, in some embodiments, the user 20 may also trigger a client node in a blockchain to the server 10 through a user terminal such as a mobile phone or an iPad, so that a transaction request can be initiated by the client node.

Of course, in some other embodiments, the consensus method for a blockchain in the embodiment of the present application may also be applied to a computer. When the consensus method for a blockchain according to the embodiment of the present application is applied to a computer, the user may directly operate the computer to trigger a transaction request, or the user may trigger a client node in a blockchain to a computer through a user terminal such as a mobile phone or an iPad, so that a transaction request can be initiated by the client node.

The technical solution of the present application and how the technical solution of the present application solves the above technical problem will be described in detail below with reference to specific embodiments. The following specific embodiments may be combined with each other, and the same or similar concepts or processes may not be repeated in some embodiments. The embodiments of the present application will be described below in conjunction with the accompanying drawings.

In an aspect, an embodiment of the present application provides a consensus method for a blockchain suitable for the above application scenario.

Figure 2:
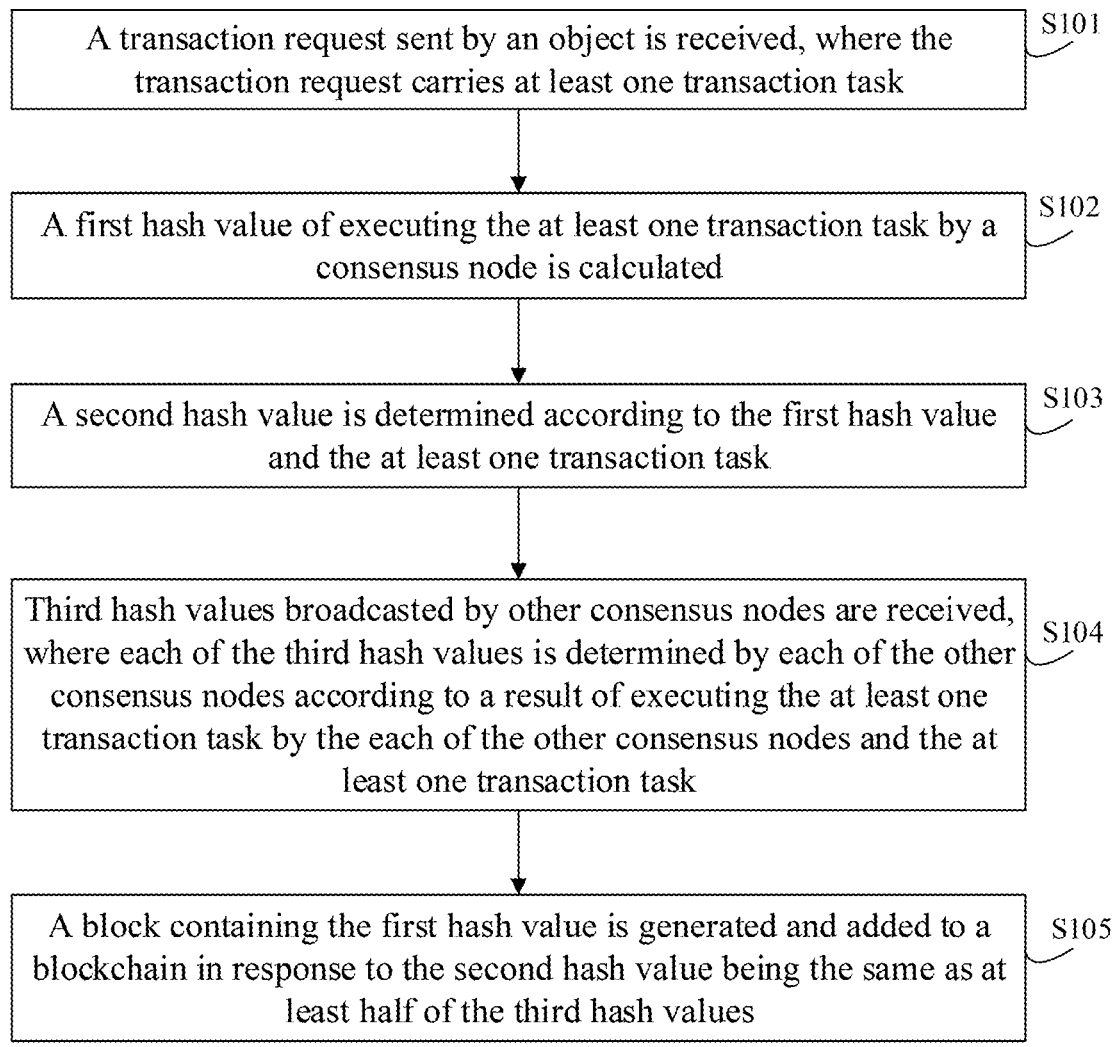
FIG. 2 is a flow schematic diagram of a consensus method for a blockchain according to one or more embodiments of the present application.

Please refer to FIG. 2, which is a flow schematic diagram of a consensus method for a blockchain according to an embodiment of the present application.

As shown in FIG. 2, the method includes:

S101: a transaction request sent by an object is received, where the transaction request carries at least one transaction task.

The transaction request may carry one or more transaction tasks.

Figure 3:
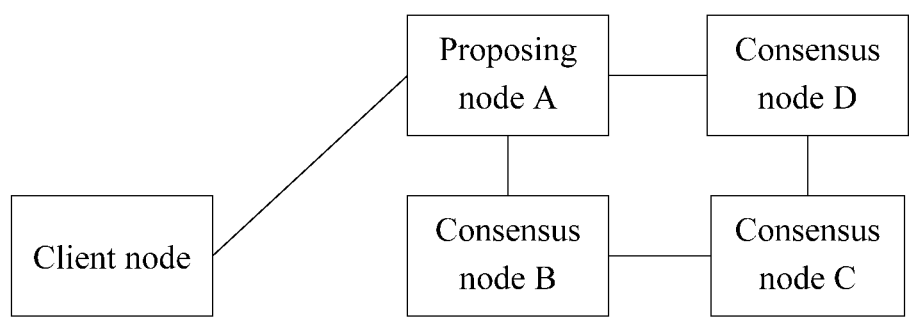
FIG. 3 is a schematic diagram of an interaction of a consensus method for a blockchain according to one or more embodiments of the present application.

FIG. 3 is a schematic diagram of an interaction of a consensus method for a blockchain according to an embodiment of the present application.

As can be known in combination with FIG. 2 and FIG. 3, in some embodiments, a client node initiates a transaction request to a consensus node, where the transaction request carries one or more transaction tasks. Furthermore, the client node specifically initiates a transaction request to a proposing node in the consensus nodes, so that the proposing node can broadcast the at least one transaction task, to enable other consensus nodes to learn about the at least one transaction.

The proposing node belongs to the consensus nodes, the proposing node is jointly elected by the consensus nodes, and any consensus node may become a proposing node.

That is, in this step, specifically, the proposing node receives a transaction request sent by the client node (such as a client terminal) and broadcasts at least one transaction task carried in the transaction request.

In some embodiments, when multiple transaction tasks are included in the transaction request, the multiple transaction tasks form a transaction sequence.

S102: a first hash value of executing the at least one transaction task by a consensus node is calculated.

S103: a second hash value is determined according to the first hash value and the at least one transaction task.

As can be known in combination with FIG. 3, in some embodiments, there are four consensus nodes, i.e., proposing node A, consensus node B, consensus node C and consensus node D.

In the existing art, the proposing node broadcasts a transaction request, and four consensus nodes (i.e., four consensus nodes including the proposing node) execute the transaction task in the transaction request respectively, and package an execution result into a block and add the block to the blockchain.

However, in the embodiment of the present application, the step of "pre-calculation" is added, i.e., the four consensus nodes calculate the first hash value of executing the at least one transaction task, respectively, and calculate the second hash value according to the first hash value and the at least one transaction task, where the algorithm for calculating according to a certain known hash value and the transaction task to obtain another hash value can refer to the existing art, and will not be repeated herein.

According to the solution of the existing art, four consensus nodes execute the transaction task in the transaction request respectively, and directly package results of executing the transaction task and add to the blockchain, which may lead to inconsistency of distributed ledgers caused by different results of executing transaction tasks due to reasons such as different parameters selected by different consensus nodes.

In addition, in the embodiment of the present application, the second hash value is calculated through the above-mentioned "pre-calculation" step, and when the second hash value meets a requirement (which will be described in detail later), a block containing the first hash value is generated, so as to avoid the above-mentioned problem of inconsistency of hash values in the existing art, thereby achieving a technical effect that distributed ledgers are consistent.

S104: third hash values broadcasted by other consensus nodes are received, where each of the third hash values is determined by each of the other consensus nodes according to a result of executing the at least one transaction task by the each of the other consensus nodes and the at least one transaction task.

In the embodiment of the present application, each of the four consensus nodes will generate a hash value according to a result of executing the at least one transaction task and the at least one transaction task, and in order to distinguish the hash values generated by different nodes, the hash values are marked as the second hash value and the third hash value.

Here, explanation is made below by taking an example where a consensus node corresponding to the second hash value is the proposing node A, and consensus nodes corresponding to the third hash value are the consensus node B, the consensus node C and the consensus node D.

The proposing node A receives a transaction request sent by the client node and broadcasts the transaction request.

The proposing node A generates a second hash value, and the consensus node B, the consensus node C and the consensus node D generate third hash values respectively (see the above examples for the specific generating method, which will not be repeated herein).

The proposing node A broadcasts the second hash value.

The consensus node B, the consensus node C and the consensus node D broadcast the third hash values, respectively.

The proposing node A receives the third hash values broadcasted respectively by the consensus node B, the consensus node C and the consensus node D.

S105: a block containing the first hash value is generated and added to a blockchain in response to the second hash value being the same as at least half of the third hash values.

Based on the above examples, if the second hash value of the proposing node A is the same as two pieces of third hash values broadcasted by other two consensus nodes (which may be the consensus node B and the consensus node C, or may be the consensus node B and the consensus node D, or may be the consensus node C and the consensus node D), then the proposing node A generates a block containing the first hash value, and adds the block to the blockchain.

Similarly, a consensus node corresponding to the second hash value is the consensus node B, and consensus nodes corresponding to the third hash value are the proposing node A, the consensus node C and the consensus node D. Then:

The proposing node A receives a transaction request sent by the client node and broadcasts the transaction request.

The consensus node B generates a second hash value, and the proposing node A, the consensus node C and the consensus node D generate third hash values respectively (see the above examples for the specific generating method, which will not be repeated herein).

The consensus node B broadcasts the second hash value.

The proposing node A, consensus node C and consensus node D broadcast the third hash values respectively.

The consensus node B receives the third hash values broadcasted respectively by the proposing node A, the consensus node C and the consensus node D.

If the second hash value of the consensus node B is the same as two pieces of third hash values broadcasted by other two consensus nodes (which may be the proposing node A and the consensus node C, or may be the proposing node A and the consensus node D, or may be the consensus node C and the consensus node D), then the consensus node A generates a block containing the first hash value and adds the block to the blockchain.

In the embodiment of the present application, by receiving third hash values broadcasted by other consensus nodes, the second hash value is compared with each third hash value to determine whether the second hash value and each third hash value are the same. If half or more than half of the third hash values are the same as the second hash value, a block containing the first hash value is generated, and the generated block is added to the blockchain. Since the block containing the first hash value is generated and added to the blockchain when the second hash value is the same as half or more than half of the third hash values, consistency of distributed ledgers can be realized.

Figure 4:
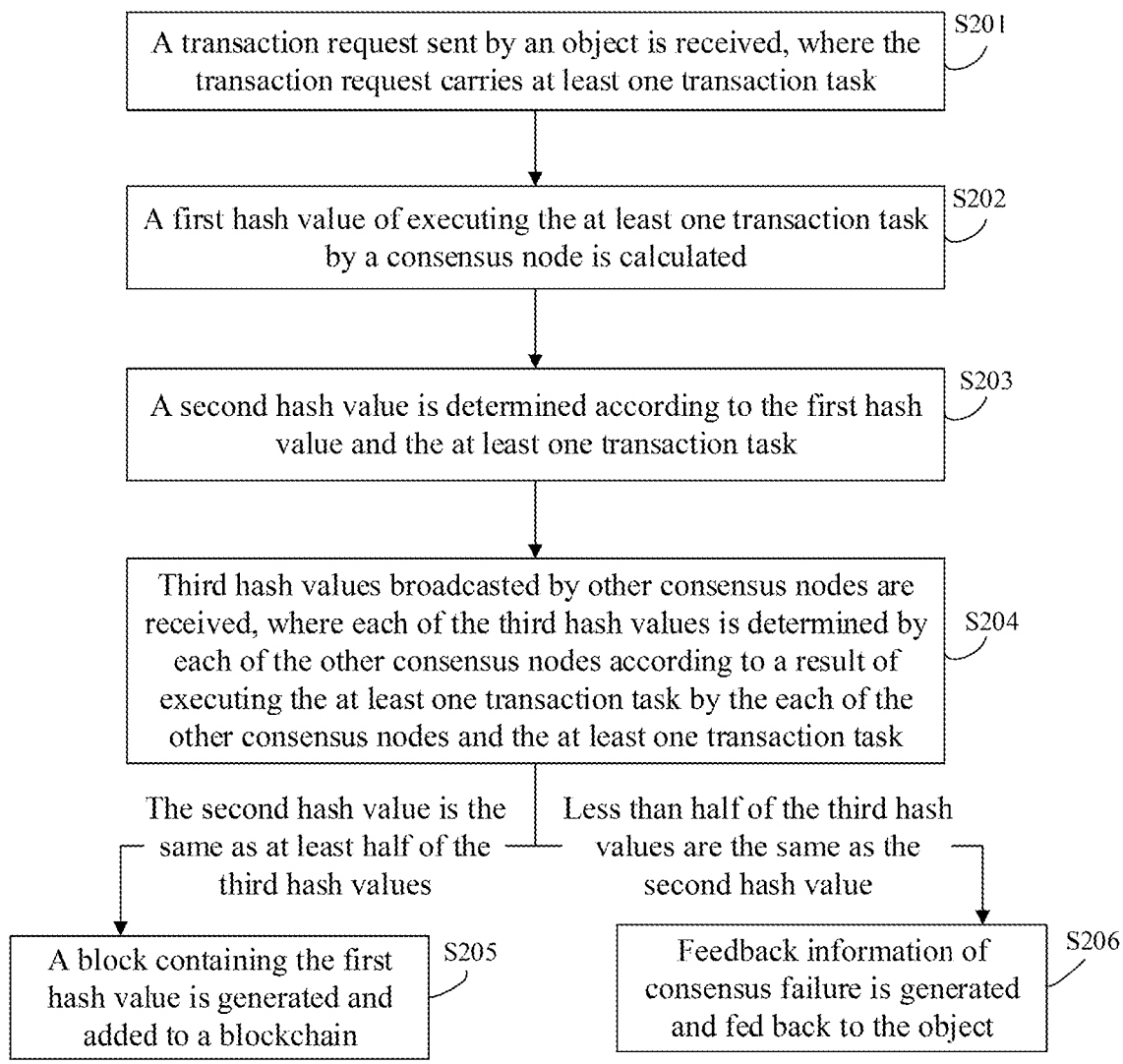
FIG. 4 is a flow schematic diagram of a consensus method for a blockchain according to one or more embodiments of the present application.

Please refer to FIG. 4, which is a flow schematic diagram of a consensus method for a blockchain according to another embodiment of the present application.

As shown in FIG. 4, the method includes:

S201: a transaction request sent by an object is received, where the transaction request carries at least one transaction task.

For the description of S201, please refer to S101, which will not be repeated herein.

S202: a first hash value of executing the at least one transaction task by a consensus node is calculated.

For the description of S202, please refer to S102, which will not be repeated herein.

S203: a second hash value is determined according to the first hash value and the at least one transaction task.

For the description of S203, please refer to S103, which will not be repeated herein.

S204: third hash values broadcasted by other consensus nodes are received, where each of the third hash values is determined by each of the other consensus nodes according to a result of executing the at least one transaction task by the each of the other consensus nodes and the at least one transaction task.

For the description of S204, please refer to S104, which will not be repeated herein.

S205: a block containing the first hash value is generated and added to a blockchain in response to the second hash value being the same as at least half of the third hash values.

For the description of S205, please refer to S105, which will not be repeated herein.

S206: feedback information of consensus failure is generated and fed back to the object in response to less than half of the third hash values being the same as the second hash value.

As can be known based on the above examples, in some embodiments, if the second hash value of the proposing node A is the same as two pieces of third hash values broadcasted by other two consensus nodes (which may be the consensus node B and the consensus node C, or may be the consensus node B and the consensus node D, or may be the consensus node C and the consensus node D), then the consensus node A generates a block containing the first hash value and adds the block to the blockchain.

However, it is possible that the second hash value of the proposing node A is different from two pieces of third hash values broadcasted by other two consensus nodes (which may be the consensus node B and the consensus node C, or may be the consensus node B and the consensus node D, or may be the consensus node C and the consensus node D), or that the second hash value of the proposing node A is different from the three third hash values broadcasted by the other three consensus nodes (the consensus node B, the consensus node C and the consensus node D), and then the proposing node A generates feedback information of consensus failure and sends the feedback information to the object, i.e., the proposing node A feeds back the feedback information to the client node (such as a client terminal).

Figure 5:
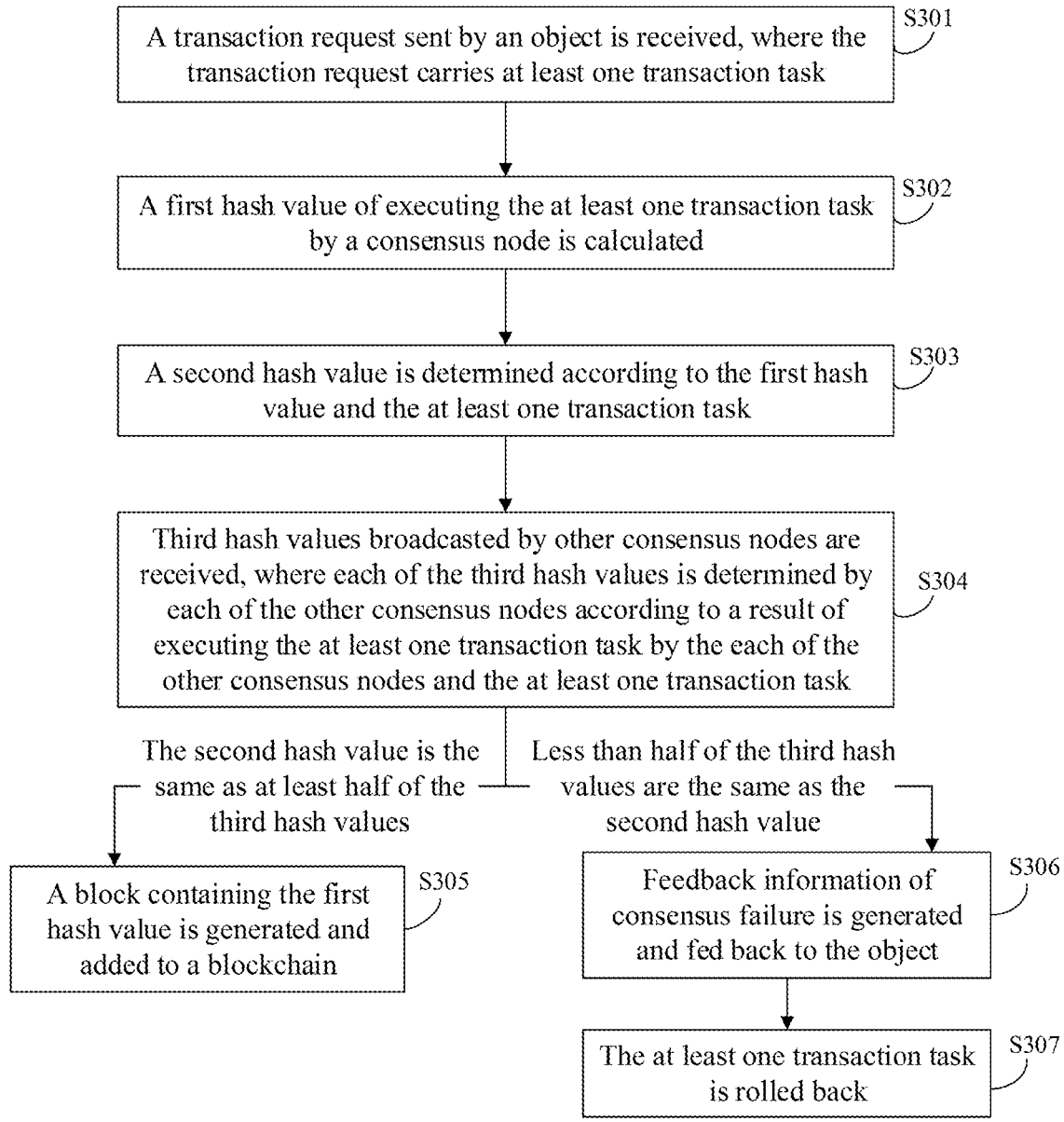
FIG. 5 is a flow schematic diagram of a consensus method for a blockchain according to one or more embodiments of the present application.

Please refer to FIG. 5, which is a flow schematic diagram of a consensus method for a blockchain according to another embodiment of the present application.

As shown in FIG. 5, the method includes:

S301: a transaction request sent by an object is received, where the transaction request carries at least one transaction task.

For the description of S301, please refer to S101, which will not be repeated herein.

S302: a first hash value of executing the at least one transaction task by a consensus node is calculated.

For the description of S302, please refer to S102, which will not be repeated herein.

S303: a second hash value is determined according to the first hash value and the at least one transaction task.

For the description of S303, please refer to S103, which will not be repeated herein.

S304: third hash values broadcasted by other consensus nodes are received, where each of the third hash values is determined by each of the other consensus nodes according to a result of executing the at least one transaction task by the each of the other consensus nodes and the at least one transaction task.

For the description of S304, please refer to S104, which will not be repeated herein.

S305: a block containing the first hash value is generated and added to a blockchain in response to the second hash value being the same as at least half of the third hash values.

For the description of S305, please refer to S105, which will not be repeated herein.

S306: feedback information of consensus failure is generated and fed back to the object in response to less than half of the third hash values being the same as the second hash value.

For the description of S306, please refer to S206, which will not be repeated herein.

S307: the at least one transaction task is rolled back in response to less than half of the third hash values being the same as the second hash value.

Based on the above examples, if the second hash value of the proposing node A is different from two pieces of third hash values broadcasted by other two consensus nodes (which may be the consensus node B and the consensus node C, or may be the consensus node B and the consensus node D, or may be the consensus node C and the consensus node D), or that the second hash value of the proposing node A is different from the three third hash values broadcasted by other three consensus nodes (the consensus node B, the consensus node C and the consensus node D), and then the proposing node A performs a rollback to execute a transaction task in a next transaction request, and performs clearing processing for the second hash value.

In some embodiments, after S304, the method includes:

S3041: a total number of the third hash values is acquired, and a same number of third hash values that are the same as the second hash value is acquired;

S3042: whether the total number is less than or equal to twice of the same number is judged, if yes, a block containing the first hash value is generated and added to the blockchain.

For example, the same number T1 of the third hash values that are the same as the second hash value is counted, and the total number T2 of the third hash values is counted, and whether 2*T1 is greater than or equal to T2 is determined; if yes, the block containing the first hash value is generated and added to the blockchain.

Based on the above examples, in some embodiments, if 2*T1 is less than T2, feedback information of consensus failure is generated and sent to the client node.

Based on the above examples, in some embodiments, if 2*T1 is less than T2, a rollback is performed so that the consensus nodes can participate in a next round of consensus.

According to another aspect of embodiments of the present application, an embodiment of the present application provides a consensus node.

Figure 6:
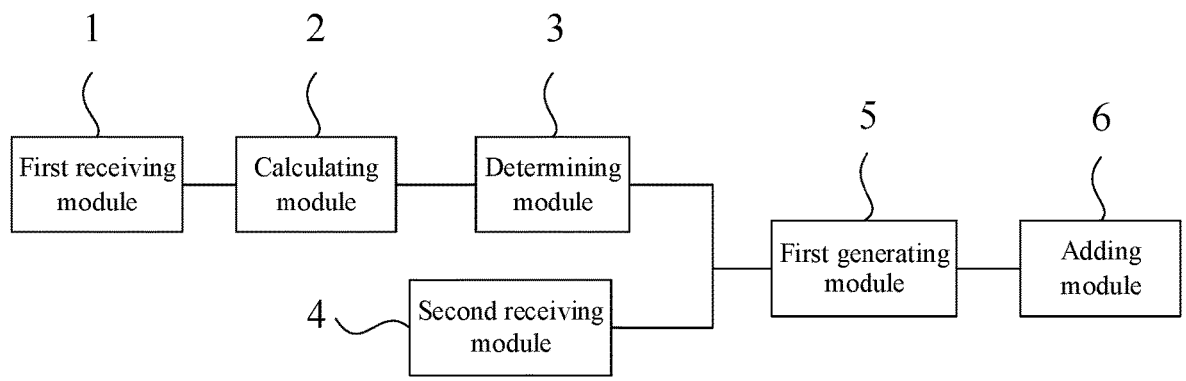
FIG. 6 is a schematic diagram of a consensus node according to one or more embodiments of the present application.

Please refer to FIG. 6, which is a schematic diagram of a consensus node according to an embodiment of the present application.

As shown in FIG. 6, the node includes:
- a first receiving module 1, configured to receive a transaction request sent by an object, where the transaction request carries at least one transaction task;
- a calculating module 2, configured to calculate a first hash value of executing the at least one transaction task by the consensus node;
- a determining module 3, configured to determine a second hash value according to the first hash value and the at least one transaction task;
- a second receiving module 4, configured to receive third hash values broadcasted by other consensus nodes, where each of the third hash values is determined by each of the other consensus nodes according to a result of executing the at least one transaction task by each of the consensus nodes and the at least one transaction task;
- a first generating module 5, configured to generate a block containing the first hash value in response to the second hash value being the same as at least half of the third hash values; and
- an adding module 6, configured to add the block containing the first hash value to a blockchain.

Figure 7:
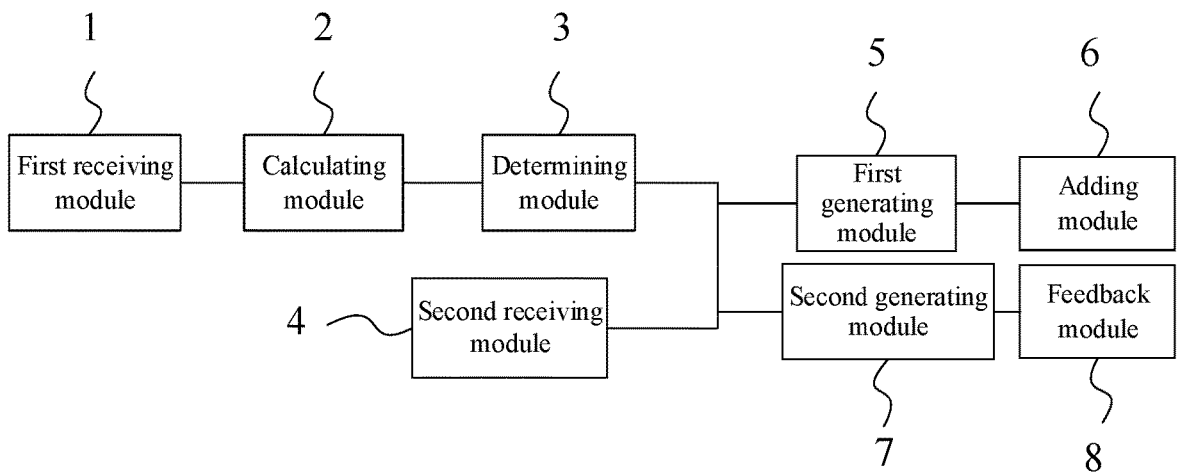
FIG. 7 is a schematic diagram of a consensus node according to one or more embodiments of the present application.

As can be known in combination with FIG. 7, in some embodiments, the consensus node further includes:
- a second generating module 7, configured to generate feedback information of consensus failure in response to less than half of the third hash values being the same as the second hash value; and
- a feedback module 8, configured to feed back the feedback information to the object.

Figure 8:
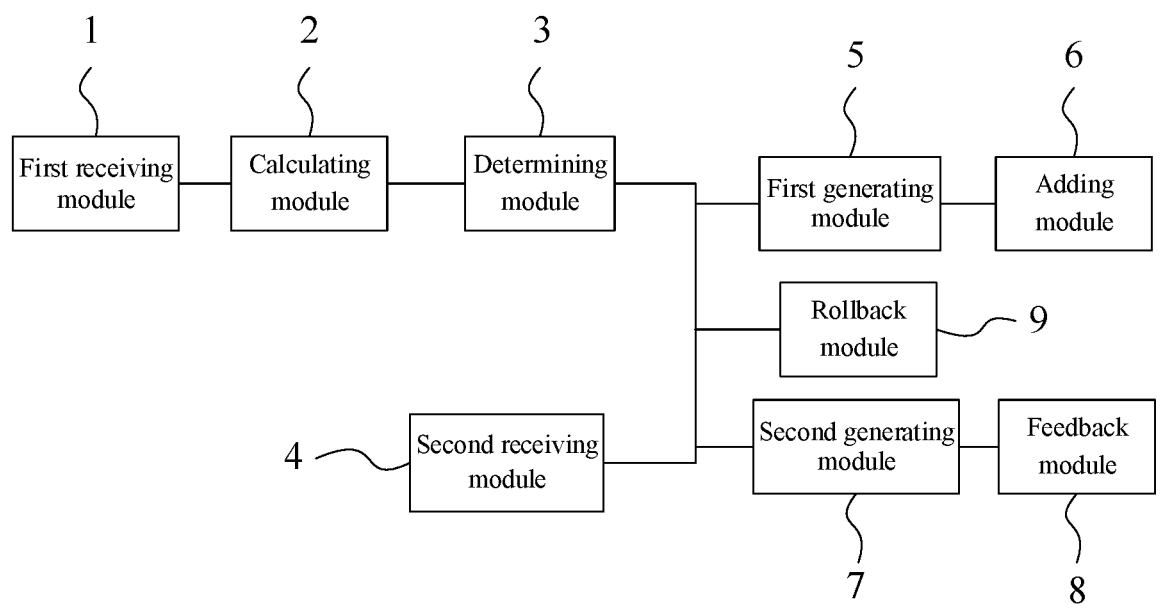
FIG. 8 is a schematic diagram of a consensus node according to one or more embodiments of the present application.

As can be known in combination with FIG. 8, in some embodiments, the consensus node further includes:
- a rollback module 9, configured to roll back the at least one transaction task in response to less than half of the third hash values being the same as the second hash value.

Figure 9:
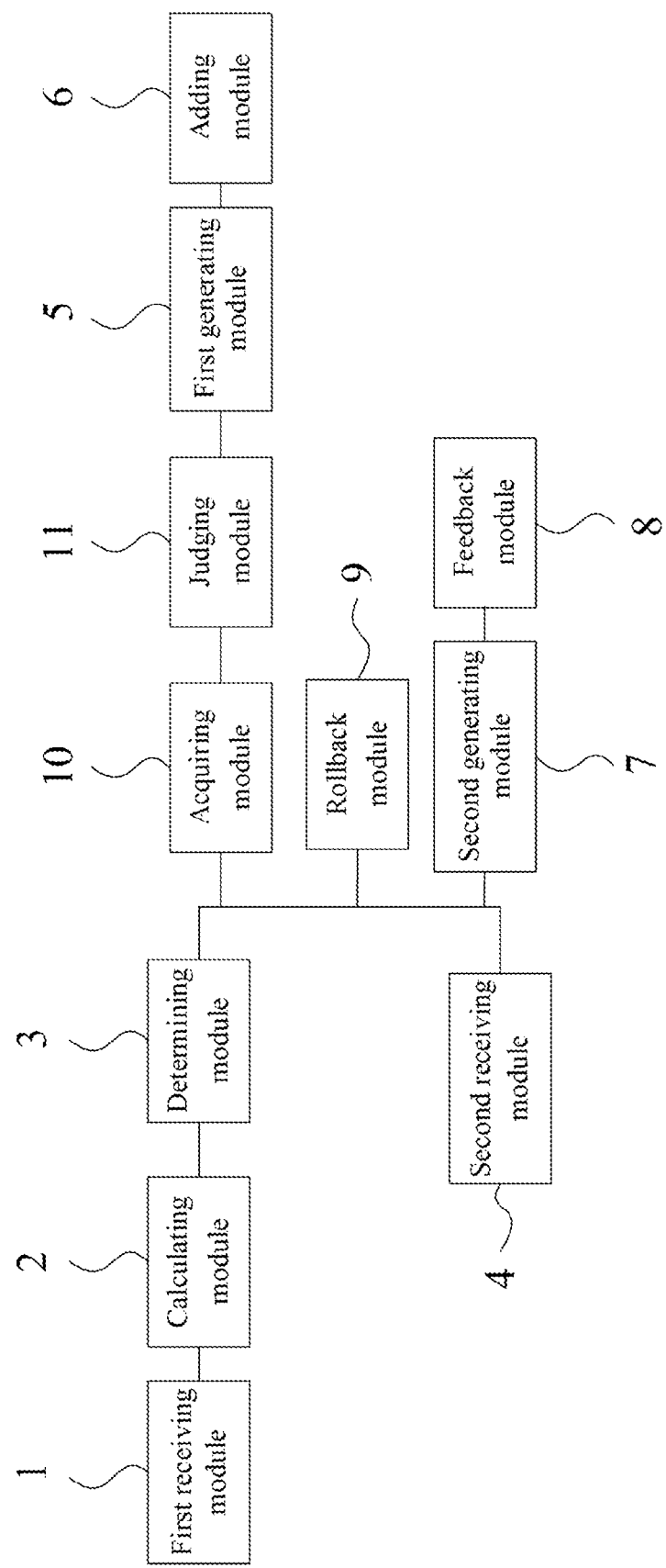
FIG. 9 is a schematic diagram of a consensus node according to one or more embodiments of the present application.

As can be known in combination with FIG. 9, in some embodiments, the consensus node further includes:
- an acquiring module 10, configured to acquire a total number of the third hash values, and acquiring a same number of third hash values that are the same as the second hash value; and
- a judging module 11, configured to judge whether the total number is less than or equal to twice of the same number; and
- the first generating module 5 being configured to execute the generation of the block containing the first hash value if the total number is less than or equal to twice of the same number.

According to another aspect of embodiments of the present application, an embodiment of the present application further provides an electronic device, including: a memory and a processor;
- the memory being a memory configured to store processor executable instructions;
- where the processor, when executing the instructions in the memory, is configured to implement the method as described in any one of the above embodiments.

Figure 10:
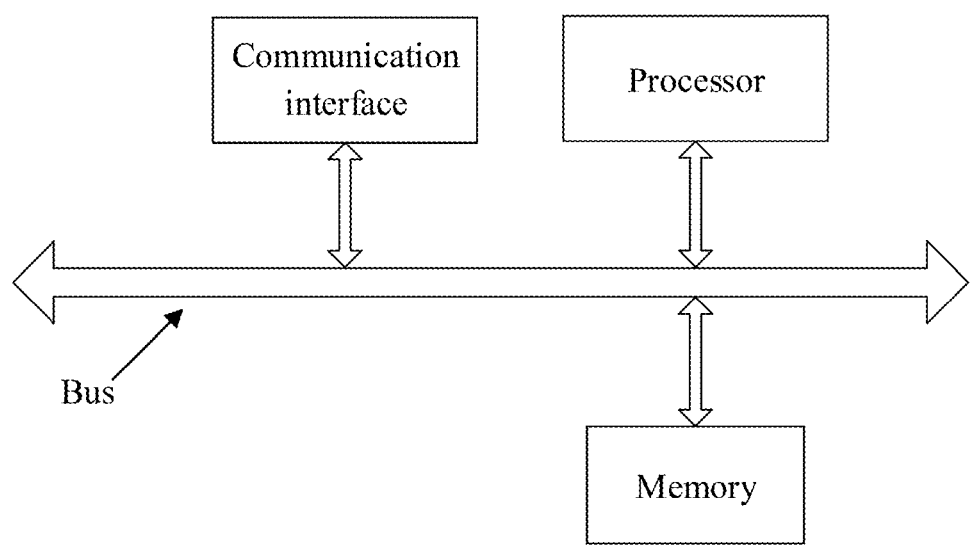
FIG. 10 is a structural schematic diagram of an electronic device according to one or more embodiments of the present application.

Please refer to FIG. 10, which is a structural schematic diagram of an electronic device according to an embodiment of the present application.

As shown in FIG. 10, the electronic device includes a memory and a processor, and the electronic device may further include a communication interface and a bus, where the processor, the communication interface and the memory are connected through the bus; the processor is configured to execute an executable module, such as a computer program, stored in the memory.

The memory may include a high-speed random access memory (RAM), and may further include a non-volatile memory, such as at least one magnetic disk memory. A communication connection between a system network element and at least one other network element is realized through at least one communication interface (which may be wired or wireless), and the Internet, a wide area network, a local network, a metropolitan area network, etc. may be used.

The bus may be an ISA bus, a PCI bus, or an EISA bus, etc. The bus may be divided into an address bus, a data bus, a control bus, etc.

The memory is configured to store a program, and the processor executes the program after receiving an execution instruction. The method disclosed in any one of the foregoing embodiments of the present application may be applied to the processor or implemented by the processor.

The processor may be an integrated circuit chip with signal processing capability. In an implementation process, various steps of the foregoing methods may be done by an integrated logic circuit of hardware in the processor or an instruction in a form of software. The above-mentioned processor may be a general-purpose processor, including a central processing unit (CPU), a network processor (NP), etc.; may also be a digital signal processor (DSP), an application specific integrated circuit (ASIC), a field-programmable gate array (FPGA) or other programmable logic devices, discrete gates or transistor logic devices, and discrete hardware components. The steps of the methods disclosed in the embodiments of the present application may be directly embodied as being implemented by a hardware decoding processor, or being implemented by a combination of hardware and software modules in the decoding processor. The software module may be located in a conventional storage medium in the existing art, such as a random access memory, a flash memory, a read only memory, a programmable read only memory or an electrically erasable programmable memory, a register, etc. The storage medium is located in the memory, and the processor reads information in the memory and performs the steps of the foregoing methods in combination with its hardware.

According to another aspect of embodiments of the present application, an embodiment of the present application further provides a computer-readable storage medium having a computer-executable instruction stored therein, and the computer, when executing the computer-executable instruction, is configured to implement the method as described in any one of the above embodiments.

In conjunction with the above technical solutions, the present application discloses a consensus method for a blockchain, a consensus node, an electronic device and a storage medium, including: receiving a transaction request sent by an object, where the transaction request carries at least one transaction task, calculating a first hash value of executing the at least one transaction task by a consensus node, determining a second hash value according to the first hash value and the at least one transaction task, receiving third hash values broadcasted by other consensus nodes, where each of the third hash values is determined by each of the other consensus nodes according to a result of executing the at least one transaction task by the each of the other consensus nodes and the transaction task, and generating and adding to the blockchain a block containing the first hash value in response to the second hash value being the same as at least half of the third hash values. A "pre-calculation" step (i.e., the step of calculating and obtaining the second hash value) is added in a consensus process, and a block of the first hash value is generated when the second hash value is the same as at least half of the third hash value, which avoids the problem in the existing art that due to the reasons such as different consensus nodes selecting different parameters, the results of executing a transaction task are caused to be different, and when a block is directly generated according to a result of executing a transaction task and added to the blockchain, inconsistency of distributed ledgers occurs, thereby achieving a technical effect that the distributed ledgers are consistent.

Readers should understand that in the description of this specification, the descriptions referring to the terms "one embodiment", "some embodiments", "examples", "specific examples" or "some examples" are intended to indicate that specific features, structures or characteristics described in combination with these embodiments or examples are included in at least one embodiment or example of the present application. In the description, the illustrative expressions of the above terms do not necessarily refer to the same embodiments or examples. Furthermore, the described specific features, structures or characteristics may be combined in any one or more embodiments or examples in a suitable manner. In addition, those skilled in the art can combine and assemble different embodiments or examples described in this description and the features of different embodiments or examples when there is no conflict.

A person skilled in the art can clearly understand that for the convenience and brevity of the description, specific working processes of the apparatus and units described above can refer to the corresponding processes in the foregoing method embodiments, which will not repeated herein.

In the several embodiments according to the present application, it should be understood that the disclosed apparatus and method may be implemented in other manners. For example, the apparatus embodiments described above are only illustrative. For example, the division of the units is only a logical function division, and there may be other divisions in actual implementation, for example, multiple units or components may be combined or integrated into another system, or some features may be ignored or not implemented.

The units described as separate components may or may not be physically separated, and the components displayed as units may or may not be physical units, that is, may be located in one location, or may be distributed to multiple network units. Some or all of the units may be selected according to actual needs to achieve the purpose of the solutions of the embodiments of the present application.

Furthermore, various functional units in the embodiments of the present application may be integrated into one processing unit, or each unit may be separate physically, or two or more units may be integrated into one unit. The above-mentioned integrated units may be implemented in the form of hardware or in the form of a software functional unit.

If the integrated units are implemented in the form of a software functional unit and sold or used as an independent product, they may be stored in a computer readable storage medium. Based on this understanding, the technical solution of the present application essentially, or a part that contributes to the existing art, or all or part of the technical solution may be embodied in the form of a software product, and the computer software product is stored in a storage medium and includes several instructions to cause a computer equipment (which may be a personal computer, a server, or a network equipment, etc.) to execute all or part of the steps of the method described in each embodiment of the present application. The aforementioned storage medium includes: a USB flash drive, a mobile hard disk, a read-only memory (ROM), a random access memory (RAM), a magnetic disk or an optical disk, and other media that can store program code.

It should also be understood that in each embodiment of the present application, the sequence numbers of the above-mentioned processes do not mean the order of execution, and the order of execution of each process should be determined by its function and internal logic, and should not constitute any limitation on the implementation process of the embodiments of the present application.

The above are only specific implementations of the present application, but the protection scope of the present application is not limited herein. Any technical personnel familiar with this technical field may easily think of various equivalent modifications or substitutions within the technical scope disclosed in the present application, and these modifications or substitutions should be covered within the protection scope of the present application. Therefore, the protection scope of the present application shall be subject to the protection scope of the claims.

The invention claimed is:

1. A consensus method for a blockchain, applied to a system comprising a plurality of consensus nodes, each of the plurality of consensus nodes being a server, the method comprising:
   receiving, by a consensus node in the plurality of consensus nodes, a transaction request sent by a terminal device, wherein the transaction request carries at least one transaction task;
   calculating, by the consensus node, a first hash value of executing the at least one transaction task;
   determining, by the consensus node, a second hash value according to the first hash value and the at least one transaction task;
   broadcasting, by the consensus node, the transaction request;
   receiving, by other consensus nodes in the plurality of consensus nodes, the transaction request broadcasted by the consensus node;
   determining a third hash value, by each of the other consensus nodes, according to a result of executing the at least one transaction task and the at least one transaction task;
   broadcasting, by each of the other consensus nodes, the determined third hash value;
   receiving, by the consensus node, third hash values broadcasted by the other consensus nodes;
   acquiring, by the consensus node, a total number of the third hash values, and acquiring, by the consensus node, a same number of third hash values that are the same as the second hash value; and judging, by the consensus node, whether the total number is less than or equal to twice of the same number; and performing, by the consensus node, generating and adding a block containing the first hash value if the total number is less than or equal to twice of the same number.

2. The method according to claim 1, wherein after receiving, by the consensus node, the third hash values broadcasted by the other consensus nodes, the method further comprises:

generating and feeding back feedback, by the consensus node, information of consensus failure to the terminal device in response to less than half of the third hash values being the same as the second hash value.

3. The method according to claim 2, wherein after the receiving, by the consensus node, the third hash values broadcasted by the other consensus nodes, the method further comprises:

rolling back, by the consensus node, the at least one transaction task in response to less than half of the third hash values being the same as the second hash value.

4. The method according to claim 1, wherein after the receiving, by the consensus node, the third hash values broadcasted by the other consensus nodes, the method further comprises:

rolling back, by the consensus node, the at least one transaction task in response to less than half of the third hash values being the same as the second hash value.

5. The method according to claim 1, wherein the block is used to record the result of executing the at least one transaction task.

6. A consensus node, wherein the consensus node comprises:

at least one processor; and a memory communicatively connected with the at least one processor; wherein, the memory stores instructions executable by the at least one processor, and when the instructions are executed by the at least one processor, the at least one processor is configured to:

receive a transaction request sent by a terminal device and broadcast the transaction request, wherein the transaction request carries at least one transaction task;

calculate a first hash value of executing the at least one transaction task by the consensus node;

determine a second hash value according to the first hash value and the at least one transaction task;

receive third hash values broadcasted by other consensus nodes, wherein each of the other consensus nodes is a server, each of the third hash values is determined by each of the other consensus nodes according to a result of executing the at least one transaction task in the transaction request broadcasted by the consensus node by the each of the other consensus nodes and the at least one transaction task;

acquire a total number of the third hash values, and acquire a same number of third hash values that are the same as the second hash value; and judge whether the total number is less than or equal to twice of the same number; and perform generating and adding a block containing the first hash value if the total number is less than or equal to twice of the same number.

7. The consensus node according to claim 6, wherein the at least one processor is further configured to:

generate feedback information of consensus failure in response to less than half of the third hash values being the same as the second hash value; and feed back the feedback information to the terminal device.

8. The consensus node according to claim 7, wherein the at least one processor is further configured to:

roll back the at least one transaction task in response to less than half of the third hash values being the same as the second hash value.

9. The consensus node according to claim 6, wherein the at least one processor is further configured to:

roll back the at least one transaction task in response to less than half of the third hash values being the same as the second hash value.

10. The consensus node according to claim 6, wherein the block is used to record the result of executing the at least one transaction task.

11. A non transitory computer-readable storage medium having an instruction stored therein, wherein when the instruction is run on a computer, the computer is caused to:

receive a transaction request sent by a terminal device and broadcast the transaction request, wherein the transaction request carries at least one transaction task;

calculate a first hash value of executing the at least one transaction task by the consensus node;

determine a second hash value according to the first hash value and the at least one transaction task;

receive third hash values broadcasted by other consensus nodes, wherein each of the other consensus nodes is a server, each of the third hash values is determined by each of the other consensus nodes according to a result of executing the at least one transaction task in the transaction request broadcasted by the consensus node by the each of the other consensus nodes and the at least one transaction task;

acquire a total number of the third hash values, and acquire a same number of third hash values that are the same as the second hash value; and judge whether the total number is less than or equal to twice of the same number; and perform generating and adding a block containing the first hash value if the total number is less than or equal to twice of the same number.

12. The non-transitory computer-readable storage medium according to claim 11, wherein when the instruction is run on the computer, the computer is further caused to:

generate feedback information of consensus failure in response to less than half of the third hash values being the same as the second hash value; and feed back the feedback information to the terminal device.

13. The non-transitory computer-readable storage medium according to claim 12, wherein when the instruction is run on the computer, the computer is further caused to:

roll back the at least one transaction task in response to less than half of the third hash values being the same as the second hash value.

14. The non-transitory computer-readable storage medium according to claim 12, wherein the block is used to record the result of executing the at least one transaction task.

15. The non-transitory computer-readable storage medium according to claim 11, wherein when the instruction is run on the computer, the computer is further caused to:

roll back the at least one transaction task in response to less than half of the third hash values being the same as the second hash value.

* * * * *